Jan. 29, 1952  A. WHITAKER  2,583,914
DIFFERENTIAL MANOMETER
Filed March 16, 1948  2 SHEETS—SHEET 1

Inventor
Alfred Whitaker
By Emery, Holcombe & Blair
Attorneys

Jan. 29, 1952 A. WHITAKER 2,583,914
DIFFERENTIAL MANOMETER
Filed March 16, 1948 2 SHEETS—SHEET 2

Inventor
Alfred Whitaker
By Emery, Holcombe & Blair
Attorneys

Patented Jan. 29, 1952

2,583,914

UNITED STATES PATENT OFFICE 2,583,914

DIFFERENTIAL MANOMETER

Alfred Whitaker, London, England, assignor to Parnall (Yate) Limited, Yate, near Bristol, England, a British company Application March 16, 1948, Serial No. 15,092
In Great Britain April 2, 1947

4 Claims. (Cl. 73—404)

This invention relates to differential manometers particularly of the direct reading differential type.

For laboratory test purposes, it is frequently desirable to have available an instrument for measuring small pressure differences of the order of 0.001 in. W. G. and the object of the present invention is to provide such an instrument which is capable of giving rapid measurement and does not require manipulation between readings.

According to the present invention, a differential manometer comprises hollow members responsive to pressure differences to be measured and supported by means including a torsion member which is twisted on vertical movement of the hollow members and means for translating the twisting movement of the torsion member into a visual indication of the degree of such movement. The hollow members are immersed in a sealing liquid in such a manner as to enclose air spaces which communicate by pipes with measuring points, the liquid used having good wetting properties in order to reduce surface tension hysteresis effects between it and the immersed members to a minimum.

In a particular construction of manometer according to the invention the hollow members responsive to pressure differences to be measured are supported from the ends of a torsionally suspended light weight beam, the torsional suspension comprising a strip of resilient metal such as beryllium-copper which is fixed at right angles to the beam at its centre of gravity so that the beam functions in the manner of a balance arm. Preferably a liquid such as paraffin oil is used.

Provision for adjustment of the sensitivity of response of the instrument may be made and for example the effective length of the torsion may be made adjustable or the movement may be provided with adjustable weights the position of which may be varied to change the centre of gravity of the movement.

In order that the invention may be more clearly understood and readily carried into effect one form of instrument constructed in accordance therewith will now be described more fully by way of example with reference to the accompanying drawings in which.

Figure 1:
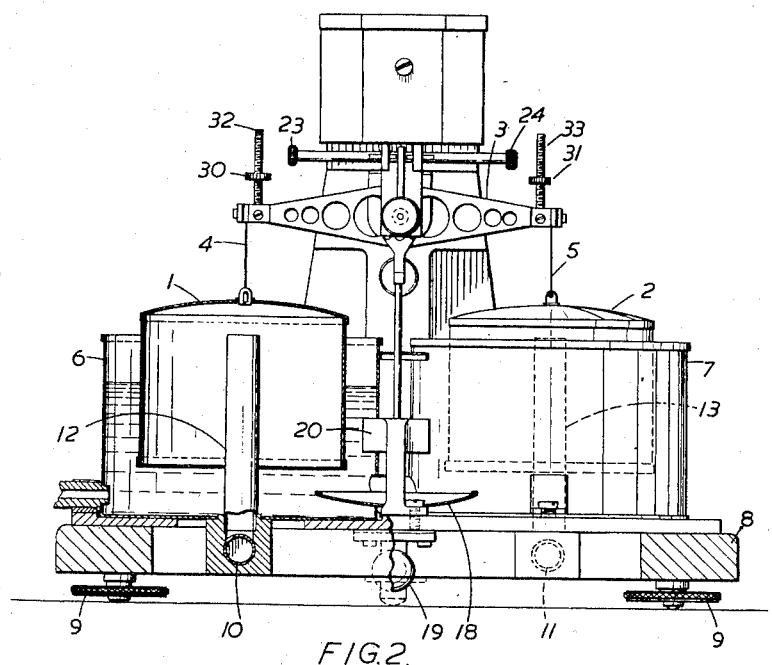
Figure 1 is a diagrammatic rear elevation of the instrument.

Referring to the drawings, the instrument is provided with two inverted light weight metal metal bells 1, 2 suspended from the ends of a light weight beam 3 by fine metal ribbons 4, 5 as shown. The bells are arranged so that their open ends dip below the surface of a sealing liquid having good wetting properties so as to ensure minimum surface tension hysteresis effects, a suitable liquid being paraffin oil, contained in separate but communicating tanks 6, 7, an air space being formed within each bell enclosed by the surface of the liquid and the top of the bell.

The tanks are supported on a platform 8 forming the base of the instrument which is provided with level adjustment screws 9 and the air spaces in the two bells communicate with measuring points by two pipes 10, 11 disposed within the tank platform and communicating with vertical pipes 12, 13 which extend through the liquid to project into the air spaces of their associated bells.

Figure 2:
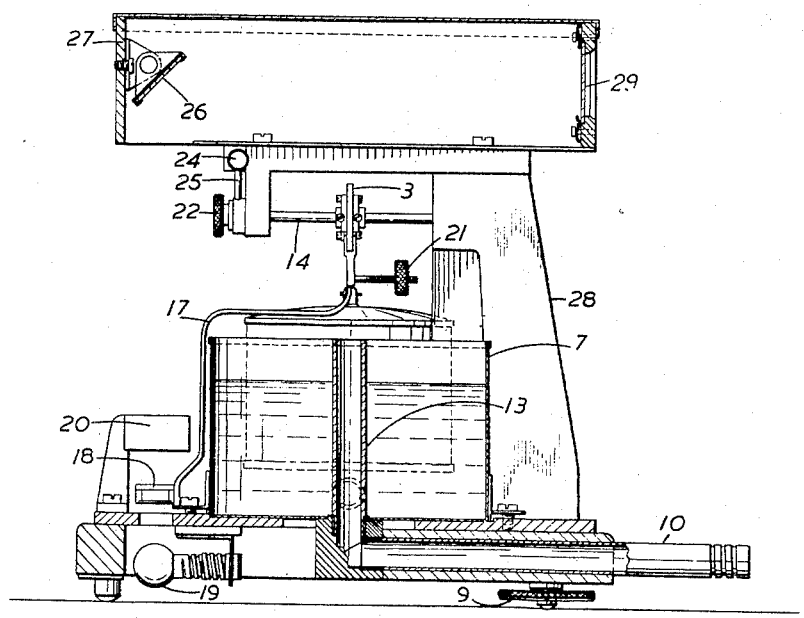
Figure 2 is a diagrammatic side view.
Figure 3:
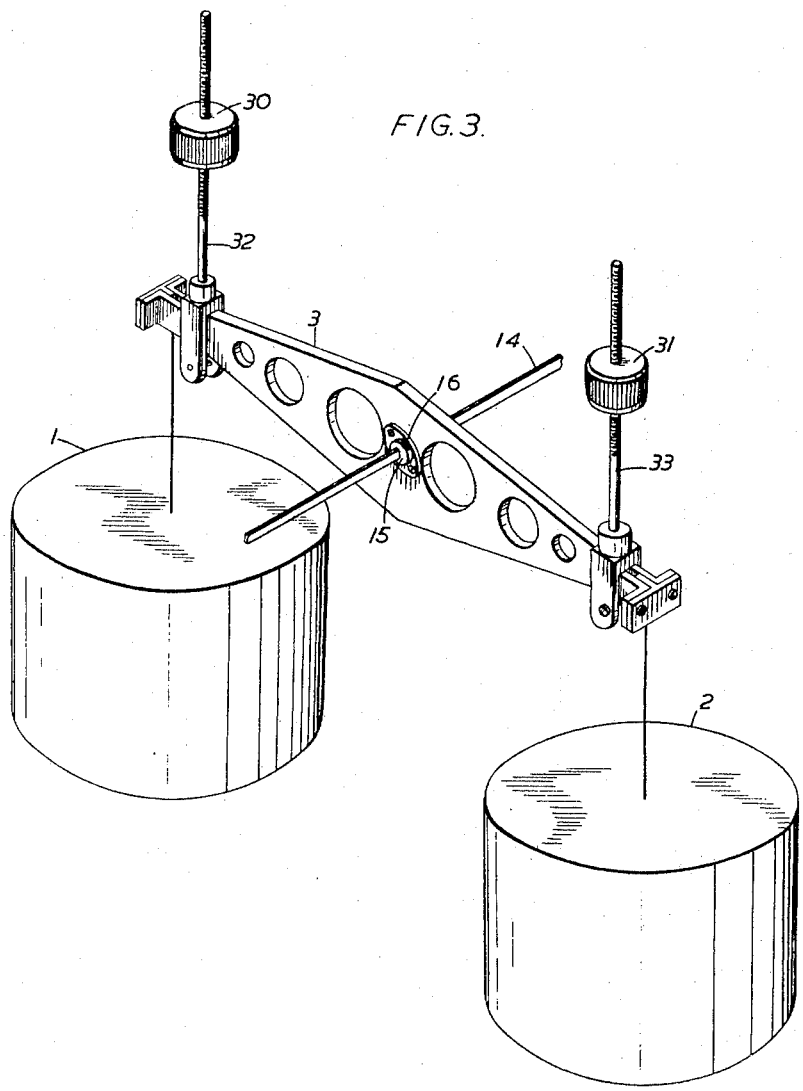
Figure 3 is a diagrammatic detail view of the bell suspension arrangement.

The supporting beam 3 is itself suspended from a beryllium-copper torsion strip 14, .002 inch thick (Figures 2 and 3) which passes through a boss 15 carried on the beam, a set screw 16 serving to secure the beam to the torsion strip. The latter is twisted on movement of the beam in response to the raising of one bell and the lowering of the other. A light scale carrying arm 17 is attached to the middle of the beam 3 and depends downwardly between and to the rear of the tanks 6, 7. A curved transparent calibrated scale 18 is attached at the extremity of the arm 17 and is arranged to swing between a small electric lamp 19 and a lens which is not shown, but is fixed in a lens holder 20. The weight of the arm 17 and scale 18 is counter-balanced by an adjustable screwed weight 21.

In order to assist in the initial levelling of the beam 3, the torsion strip 14 is held at one end by a tensioning screw not shown and at the other by a rotating knob 22, a fine adjustment and clamping of the knob 22 being provided by adjusting screws 23, 24 which engage opposite sides of a vertical pin 25.

The lens in the holder 20 projects a magnified image of the scale 18 on to a mirror 26 within a metal box 27 supported from a bracket 28 fixed to the base of the instrument and the mirror reflects the image of the scale on to a ground glass screen 29 forming the front wall of the box 27. The screen thus presents a direct indication of the deflection of the beam 3, the projected scale being calibrated in terms of pressure difference between the air spaces in the two bells.

Assuming the bells are each 8 centimetres in diameter, and a pressure difference of 1/100 in. W. G. within, there will be an upthrust of $$\pi \times 4^2 \times 0.025 \ (=1.25)$$

gm. at one end of the beam. As the beam tilts, two forces are brought into play tending to restore equilibrium. Firstly, there is the twist in the suspension strip giving rise to a restoring force directly proportional to the twist and the elasticity of the strip and to the dimensions thereof according to the factor (thickness)$^3$/(length) x (depth). Secondly, one of the bells rises out of the liquid in its tank and the other sinks into its tank giving rise to Archimedean forces. Assuming the wall thickness of each bell is 0.003 in. a movement of about 3½ cms. would be necessary to balance a pressure loading equal to 1.25 gm. in the absence of help from the torsion strip, when the sealing liquid has unit density. In the case of the instrument being described, about three-quarters of the restoring force is provided by the torsion strip and one-quarter by the Archimedean forces.

The maximum pressure difference which can be measured by the instrument described is limited to that which causes one bell to ground on the bottom of its tank, or the other bell to lift out of the liquid in its tank. This maximum pressure can be raised without loss of sensitivity in operation, by appropriately loading the high pressure bell, the limit to the extended pressure range being determined by the strength of the torsion strip. The top centre of each bell may conveniently be formed with a depression to accommodate weights and by loading one bell, the scale zero is shifted and the maximum pressure increased. Weights of 3 gm. and 6 gm. on the high pressure bell allow use of the instrument in ranges approximately 0.024 to 0.048 in. W. G. and 0.048 to 0.072 in. W. G.

In order to provide for adjustment of the sensitivity of the instrument, the ends of the beam 3 are loaded with screwed brass weights 30, 31, the vertical heights of which are adjustable on their screw threaded supports 32, 33. By raising the weights 30, 31, the centre of gravity of the beam assembly is raised and the sensitivity can be increased up to a point of instability. If the sensitivity is adjusted to a degree more than ten times the normal, the instrument becomes unsatisfactorily sluggish and a factor of eight times the normal sensitivity is found to be a convenient maximum.

As it has already been shown that the restoring force due to the torsion strip is proportional to its length, it will be understood that the sensitivity of the instrument may be reduced if desired simply by reducing the effective twisting length of the strip. This may be done, for example, by a small clamp screwed on to one side of the strip to reduce the length which can be twisted. Reduction of length results in an increase in the restoring force for any deflection and reduces the deflection for a given pressure.

As comparatively large volumes of air have to flow in and out of the bells when the pressure changes, fairly large bore tubing should be used for connecting the instrument to the measuring points in order to maintain a high speed of response of the instrument.

From consideration of the preceding description it will be seen that the moving parts of the instrument are designed to eliminate or reduce friction to a minimum, there being no rolling or sliding contact at any point. This feature and the use of a liquid having good wetting properties resulting in low surface tension hysteresis effects as previously indicated, together contribute to the high degree of sensitivity of the instrument and to its capability of providing rapid repetition of readings.

Modifications in design and construction may of course be made and any liquid other than paraffin oil, having the appropriate qualities may be used. Although the use of fine ribbons for suspending the bells has been found to have advantages, fine wires may be used.

I claim:

1. A differential manometer comprising two hollow members having open bottoms immersed in a liquid and vertically movable in response to pressure differences therein to be measured, said hollow member being supported from the ends of a balance beam secured at its middle point to a torsion member which is fixed at its ends whereby it is twisted on vertical movement of said hollow members to rock said beam and means for translating the rocking movement of said balance beam into a visual indication of the degree of such movement.

2. A differential manometer comprising two hollow members responsive to pressure differences to be measured, a light weight beam, means supporting said hollow members from the ends of said light weight beam, a torsion member supporting said light weight beam, a container for a liquid and liquid in said container in which said hollow members are immersed so as to enclose air spaces within said hollow members, a pipe connecting one of said air spaces to a measuring point, a second pipe connecting the other of said air spaces to a second measuring point and means for translating the movement of said beam against its torsional suspension into a visual indication of the degree of such movement.

3. A differential manometer comprising two hollow members responsive to pressure differences to be measured, a light weight beam, means supporting said hollow members from the ends of said light weight beam, a torsion member supporting said light weight beam, a container for a liquid and liquid in said container in which said hollow members are immersed so as to enclose air spaces within said hollow members, a pipe connecting one of said air spaces to a measuring point, a second pipe connecting the other of said air spaces to a second measuring point and means for translating the movement of said beam against its torsional suspension into a visual indication of the degree of such movement, said torsion member consisting of a strip of resilient metal fixed at its ends and secured at right angles to the beam at its centre of gravity so that the beam functions in the manner of a balance arm.

4. A manometer according to claim 3 in which said strip of resilient metal consists of a beryllium-copper alloy.

ALFRED WHITAKER.

REFERENCES CITED

The following references are of record in the file of this patent:

UNITED STATES PATENTS

| Number | Name | Date |
|---|---|---|
| 340,007 | Roeder | Apr. 13, 1886 |
| 779,255 | Blauvelt | Jan. 3, 1905 |
| 1,192,599 | Bailey | July 25, 1916 |